Jan. 16, 1962 C. VAN DER LELY ET AL 3,016,676
SIDE DELIVERY RAKE
Filed July 19, 1957 2 Sheets-Sheet 1

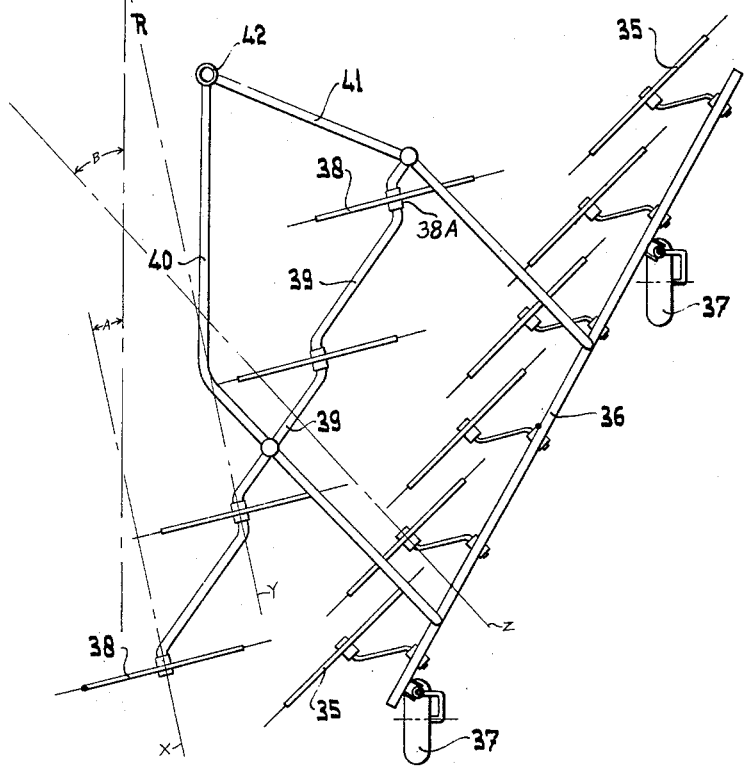

United States Patent Office 3,016,676
Patented Jan. 16, 1962

3,016,676
SIDE DELIVERY RAKE
Cornelis van der Lely and Ary van der Lely,
Maasland, Netherlands
Filed July 19, 1957, Ser. No. 672,989
Claims priority, application Netherlands May 9, 1953
15 Claims. (Cl. 56—377)

This invention relates to agricultural implements and more particularly to side delivery rakes provided with a number of rake wheels, which are freely rotatable about their axles and put into rotation by their contact with the ground when the implement is moved forward.

Conventional devices of this kind are provided with rake wheels having large diameters such as, for example, 4 feet and greater. The use has even been proposed of heavy and expensive rake wheels having diameters of 5.3 feet with which material gathered to a large height of 3.3 feet can be worked without difficulty.

It is an object of the present invention to provide an implement of a very light construction.

The present invention is based upon the principle that material accumulated to large heights can be worked with relatively small rake wheels and that the use of small rake wheels is attended by important advantages. The use of small rake wheels can advantageously be realized if the upper part of the rake wheel is screened to prevent this part from coming into contact with the material.

A further object of the invention is to provide a suitable frame construction in which a frame beam is led through the hubs of the rake wheels and extends from the back of one rake wheel to the front side of a following rake wheel.

A further object is to provide an improved arrangement of the rake wheels, the rake wheels delivering the material to the same side, the planes of the rake wheels, however, making an angle with each other.

This application is a continuation-in-part of application Serial Number 427,155, filed May 3, 1957, and now Patent 2,807,927.

The invention will be hereinafter explained in greater detail with reference to the accompanying drawings in which preferred embodiments of the invention have been diagrammatically illustrated by way of example and in which:

FIG. 4 shows the latter device in plan view and FIG. 5 is a plan view of still another embodiment of the invention.

Figure 1:
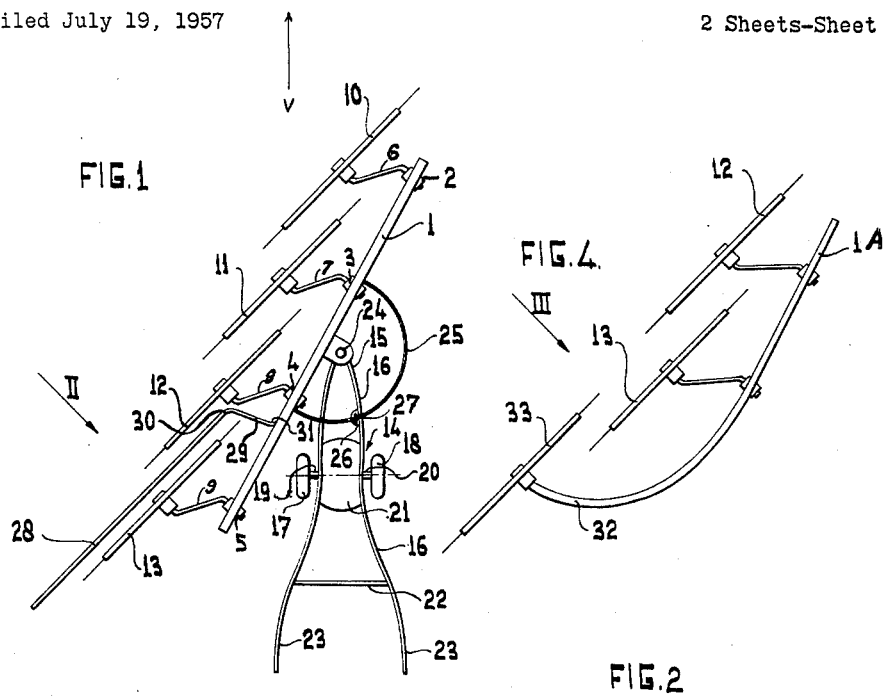
FIG. 1 is a plan view of a side delivery rake according to the invention.

FIG. 1 shows a side delivery rake which is particularly suitable for light work. The rake consists of a mobile frame or beam 1 bearing four horizontal journals 2, 3, 4 and 5 in which four cranks 6, 7, 8 and 9 are journalled. On these cranks are mounted four small rake wheels 10, 11, 12 and 13 of the same size. The diameter of said rake wheels is 2 feet and the distance between them, measured at right angles to the travelling direction V, is about 10 inches.

The beam 1 is carried by a two-wheeled vehicle 14 and is hingedly connected to the foremost part 15 of the frame 16 thereof. The frame 16 is provided with two running wheels 17 and 18, the axles 19 and 20 of which are in alignment. The running wheels 17 and 18 are driven by a motor 21 which is arranged on the frame between these wheels. The rearmost part 22 of the frame 16 is provided with handles 23, by which the device may be controlled when in use for various agricultural and horticultural purposes. The beam 1 is connected to the part 15 of the frame so as to be rotatable about a vertical axle 24 and is provided with a semi-circular ring 25 which is used to secure the angular position of the beam 1 in a horizontal plane with regard to the frame 16 and consequently to the travelling direction by the introduction of a pin 26 through a hole 27 in the said ring.

Figure 2:
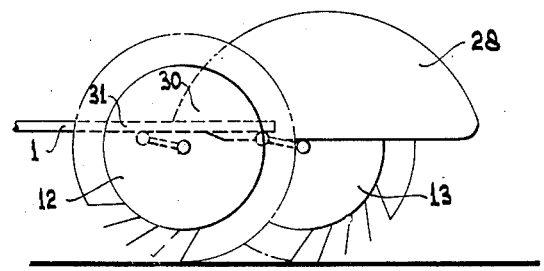
FIG. 2 is a fragmentary side view of the device according to FIG. 1 viewed in the direction of arrow II.

In order to prevent the upper half of the rake wheel 13 from coming into undesired contact with material delivered sideways, a guiding plate 28 (see also FIG. 2) is mounted upon the beam 1 by means of a horizontal arm 29 connected to the foremost end of the guiding plate 28 and attached at 31 to the beam 1, said plate being located in front of the wheel 13, but behind the wheel 12. The rearmost rake wheel now can have the same dimensions as the other rake wheels.

Figure 4:
Figure 3:
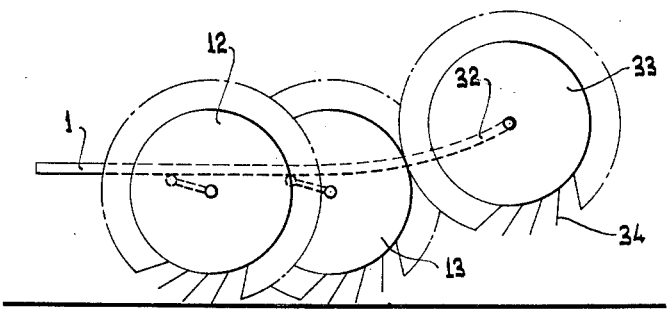
FIG. 3 is a side elevation of a variation of the device shown in FIG. 4.

FIGS. 3 and 4 show another embodiment giving a further solution to the difficulties which may be encountered at the end of a series of small rake wheels. In this embodiment, near the rake wheel 13, the end 32 of the beam 1A is bent upwardly and laterally and said end carries a disk or guide member 33 which is preferably provided with circumferential teeth 34 and which is partially located in front of the rake wheel 13. The disk 33 is rotatable in a plane which is substantially parallel to the plane of the rake wheel 13 and constitutes to a certain extent a rake wheel which is, however, situated at such an elevation above the ground that it can be put into rotation only by the material which is being passed along.

The material displaced by the rake wheels performs a rolling motion owing to which the material lifted up by the rake wheels 12 and 13 presses against said wheels only to a height of about 1 foot, but remains at some distance from the wheel at a higher elevation. When the rake wheel 13 is the last one of a row of rake wheels and the material is not engaged by a further rake wheel, the latter does not perform a rolling motion in the direction of travel of the device and, if a big swath is formed by the rake wheels, the top of the swath can fall behind the rake wheel 13 so that this rake wheel will be stopped by the crop. To prevent this the rake wheel 33 is provided; this rake wheel comes into contact with the crop and is set into rotation thereby so that it delivers the material that forms the top of the swath further to the left. In principle it is possible to make the rake wheels of a conventional side delivery rake one half their normal height according to the invention; however, in order that the wheels sufficiently overlap one another and are adapted to cover collectively the same working width, the number of rake wheels should be increased. If the diameter of the rake wheels is halved and the number thereof is doubled, which doubling is actually unnecessary, an important saving of weight and cost of rake wheels will be obtained, since each wheel only requires about one fourth of the structural material needed for a wheel of double its dimensions. Thus, in total there will be a saving of at least half the amount of required material, which is important because of the expensive spring steel used for the spokes and the teeth of the wheels.

Moreover, each of the small wheels will have such a small weight that it will be possible to let the wheels rest with their full weight on the ground. Thus devices, such as springs for reducing wheel pressure on the ground, may be omitted. In addition to a saving in costs, the invention presents the advantage that in the most simple manner a wheel pressure is realized which is wholly independent of the position of the wheel.

Small rake wheels according to the invention present the advantage that they are able to adapt themselves more readily to rough terrain and are more suitable for removing material from depressed areas, such as ditches and the like.

If the diameters of a series of rake wheels and the distances therebetween are halved, the free space between two overlapping rake wheels and the ground, viewed in a direction at right angles to the wheel plane, may be halved as well. In principle, the reduction of this space is not necessary, and consequently it will be unnecessary, when halving the diameters of the rake wheels, to halve also the distances between the axes of the rake wheels. It follows that the number of rake wheels need not be doubled, but need only be increased by a factor 1.5–1.7. This means a further considerable saving in costs and weight.

The following explains why special precautions are necessary if smaller rake wheels are to be used: In use, the device according to FIG. 1, for example, operates in such a manner that the material lying on the ground will be deposited on the left of the device in the shape of a trailing oblong heap aligned with the direction of travel V. The material that is located just in front of the rake wheels, however, extends in oblique direction along the faces of the rake wheels. The oblong heap adjoins thereto at an angle. Since the rake wheel 13 is located at the left-most extreme and thus just at the region of this transition, the wheel 13 operates under somewhat different conditions than the rake wheels 10, 11 and 12. The material delivered by the rake wheel 13 is not engaged by a further wheel, so that the material tends to press against said wheel at higher elevations. As a consequence, it is possible that the material might be forced by the upper half of the wheel 13 in a forward direction, so that the material would drop behind the preceding wheel. In order to avoid this, the upper part of the wheel 13 is prevented from coming into contact with the material by a plate or a rotatable disc.

Devices provided with very small rake wheels, such as those according to FIGS. 1–4, may be made suitable for heavier work by arranging in front of the row of raking members a row of additional raking members which are elevated above the ground. A device of this kind is shown in FIG. 5.

Six small rake wheels 35 are fixed by means of cranks (in the same manner as the rake wheels 10—13 of FIG. 1 are connected to the beam 1) to a frame or beam 36 which is supported by running wheels 37. In front of this row of six main rake wheels, relative to the direction of travel of the device, is arranged a row of four additional raking or guide members 38 which are rotatable on parallel axes forming an angle A with the travelling direction R which angle is smaller than the angle B formed by the axes of the rake wheels or disks 35 with said direction. The rake wheels 38 are elevated above the ground and their axles are provided by a beam or support 39.

The support 39 is led through the hubs 38A of the raking members 38 and extends from the back of one rake wheel to the front side of a following rake wheel. The support 39 and the beam 36 are connected together by bows 40 and 41 intersecting one another at a draw point device 42. Elements 36 and 39—41 constitute the frame of the device. Angles A and C are preferably smaller than angle B defined by the axes of rotation Z of wheels 35 and the direction of travel.

In FIG. 5, the crop is displaced to the left by the rake wheels 35. The crop performs a rolling motion before said rake wheels and presses against them only to a height of about 1 foot, remaining at some distance from the wheels at a higher elevation. In a plane perpendicular to the rake wheels the crop lies before the rake wheels substantially as a three-cornered heap. When the heap becomes too high, the top of it may fall back against the rake wheel 35 whereby the rake wheels are buried under the crop and cannot rotate further.

So as to prevent this the rake wheels 38 are mounted in front of the rake wheels 35. The former are elevated above the ground and will come into contact with the material that forms the top of the heap before the rake wheels 35. The rake wheels 38 are set into rotation by their contact with the crop and will "guide" the crop which forms the top of the heap to the left and "guard" the rake wheels 35 from being buried under the crop.

If more than one additional raking member is used, the most efficient operation is obtained, with the discharge side of the foremost of two consecutive additional raking members located, viewed in the travelling direction, in front of the hindmost additional raking member.

In summary, it is to be noted that in the various embodiments plate 28 (FIGS. 1 and 2), disk 33 (FIGS. 3 and 4), and wheels 38 (FIG. 5) constitute guide members or means to shield the operatively associated rake wheels at least in part from the crop being displaced. These rake wheels are vertically disposed (see, for example, rake wheels 6—9 in FIG. 1) and thus inherently include upper portions. At least the upper portion of one rake wheel of each embodiment has the aforesaid means mounted in correspondence therewith and is thus shielded from crop.

What we claim is:

1. A device for laterally displacing material lying on the ground comprising a frame adapted for ground traversing movement and having a normal direction of travel, a plurality of rake wheels in front of and on said frame in overlapping relation and arranged obliquely of said direction, and means in front of and on said frame and in front of at least the rearmost of said rake wheels to shield the same from excessive accumulations of said material.

2. A device as claimed in claim 1 wherein said means is a guide plate disposed adjacent the upper portion of said rearmost raking wheel.

3. A device as claimed in claim 1 wherein said means is a rotatable disk.

4. A device as claimed in claim 1 wherein said means comprises a support and a plurality of disks rotatable on said support.

5. A device as claimed in claim 4 wherein said supports extends through the latter said disk.

6. A device as claimed in claim 5 wherein the latter said disks are angularly disposed with respect to said rake wheels.

7. A device as claimed in claim 1 comprising a vehicle operatively associated with said frame and supporting the same for ground traversing movement, said frame being pivotally connected to said vehicle.

8. A device as claimed in claim 7 comprising running wheels on and supporting said vehicle.

9. A device as claimed in claim 8 comprising a motor on said vehicle and driving said wheels.

10. A device as claimed in claim 9 comprising handles on said vehicle for guiding the same.

11. A device as claimed in claim 1 comprising cranks pivotally connected said rake wheels to said frame.

12. A device as claimed in claim 2 wherein said plate extends between and parallel to the rearmost two rake wheels.

13. A device as claimed in claim 3 wherein said disk includes tines.

14. A device as claimed in claim 3 comprising cranks connecting said rake wheels with said frame and wherein said frame includes an end rotatably supporting said disk.

15. A device as claimed in claim 4 comprising bows connecting said support and frame, said bows being connected together at a point spaced from said frame.

References Cited in the file of this patent

UNITED STATES PATENTS

| | | |
|---|---|---|
| 720,098 | Bamford | Feb. 10, 1903 |
| 2,201,317 | Neidhart | May 21, 1940 |
| 2,447,354 | Morrill | Aug. 17, 1948 |
| 2,643,505 | Harper et al. | June 30, 1953 |
| 2,680,343 | Enos | June 8, 1954 |
| 2,681,543 | Richey | June 22, 1954 |
| 2,689,446 | Sorrels | Sept. 21, 1954 |

FOREIGN PATENTS

| | | |
|---|---|---|
| 986,330 | France | Mar. 21, 1951 |